(12) United States Patent
Yun et al.

(10) Patent No.: US 12,375,811 B2
(45) Date of Patent: Jul. 29, 2025

(54) ELECTRONIC DEVICE INCLUDING CAMERA MODULE AND ELECTRONIC DEVICE OPERATING METHOD

(71) Applicant: SAMSUNG ELECTRONICS CO., LTD., Suwon-si (KR)

(72) Inventors: Jaemu Yun, Suwon-si (KR); Kwangseok Byon, Suwon-si (KR); Wonseok Song, Suwon-si (KR); Kihuk Lee, Suwon-si (KR); Min Heu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 158 days.

(21) Appl. No.: 18/236,248

(22) Filed: Aug. 21, 2023

(65) Prior Publication Data

US 2023/0396885 A1 Dec. 7, 2023

Related U.S. Application Data

(63) Continuation of application No. PCT/KR2022/002379, filed on Feb. 17, 2022.

(30) Foreign Application Priority Data

Mar. 23, 2021 (KR) .................. 10-2021-0037358

(51) Int. Cl.
*H04N 23/68* (2023.01)
*H04N 23/45* (2023.01)
*H04N 23/667* (2023.01)

(52) U.S. Cl.
CPC ........... *H04N 23/687* (2023.01); *H04N 23/45* (2023.01); *H04N 23/667* (2023.01)

(58) Field of Classification Search
None
See application file for complete search history.

(56) References Cited

U.S. PATENT DOCUMENTS

| | | | |
|---|---|---|---|
| 7,634,180 B2 | 12/2009 | Suzuki | |
| 10,326,942 B2 | 6/2019 | Shabtay et al. | |
| (Continued) | | | |

FOREIGN PATENT DOCUMENTS

| | | | |
|---|---|---|---|
| EP | 3 667 413 A1 | 6/2020 | |
| JP | 2018-18021 A | 2/2018 | |
| (Continued) | | | |

OTHER PUBLICATIONS

Extended European Search Report dated Sep. 6, 2024, issued by the European Patent Office in European Application No. 22775913.1.

(Continued)

*Primary Examiner* — Paul M Berardesca
(74) *Attorney, Agent, or Firm* — Sughrue Mion, PLLC

(57) ABSTRACT

An electronic device includes a first camera including a first lens and having a first field of view, a second camera including a second lens module and having a second field of view, a first Optical Image Stabilization (OIS) driver; a second OIS driver; and a processor configured to: operate the first camera as a main camera; position a center of the first lens at a first point; position a center of the second lens at a point on a first axis passing the first point; detect an event of switching the main camera to the second camera; based on the event being detected, operate the second camera as the main camera; move the center of the second lens to a second point; and move the center of the first lens to a point on a second axis and passing the second point.

18 Claims, 12 Drawing Sheets

(56) References Cited

U.S. PATENT DOCUMENTS

| | | | |
|---|---|---|---|
| 2014/0132738 A1 | 5/2014 | Ogura et al. | |
| 2016/0165137 A1 | 6/2016 | Kang | |
| 2017/0187962 A1* | 6/2017 | Lee | G02B 27/646 |
| 2018/0048825 A1 | 2/2018 | Wang | |
| 2019/0082166 A1 | 3/2019 | Song et al. | |
| 2020/0169665 A1 | 5/2020 | Shin et al. | |
| 2020/0213515 A1 | 7/2020 | Jung et al. | |
| 2021/0075897 A1* | 3/2021 | Li | H04N 23/55 |
| 2021/0149087 A1 | 5/2021 | Aschwanden | |
| 2021/0297596 A1 | 9/2021 | Enta | |
| 2021/0360172 A1* | 11/2021 | Liu | H04N 23/632 |

FOREIGN PATENT DOCUMENTS

| | | | |
|---|---|---|---|
| KR | 10-2016-0042694 A | 4/2016 | |
| KR | 10-2017-0019753 A | 2/2017 | |
| KR | 10-2017-0045552 A | 4/2017 | |
| KR | 10-2018-0101195 A | 9/2018 | |
| KR | 10-1910288 B1 | 10/2018 | |
| KR | 10-2019-0019504 A | 2/2019 | |
| KR | 10-2019-0066664 A | 6/2019 | |
| KR | 10-2019-0119856 A | 10/2019 | |
| KR | 10-2083719 B1 | 3/2020 | |
| KR | 10-2020-0094128 A | 8/2020 | |
| KR | 10-2020-0125742 A | 11/2020 | |
| WO | WO-2018077446 A1 * | 5/2018 | |

OTHER PUBLICATIONS

International Search Report dated Jun. 7, 2022, issued by the International Searching Authority in International Application No. PCT/KR2022/002379 (PCT/ISA/210).

Written Opinion dated Jun. 7, 2022, issued by the International Searching Authority in International Application No. PCT/KR2022/002379 (PCT/ISA/237).

* cited by examiner

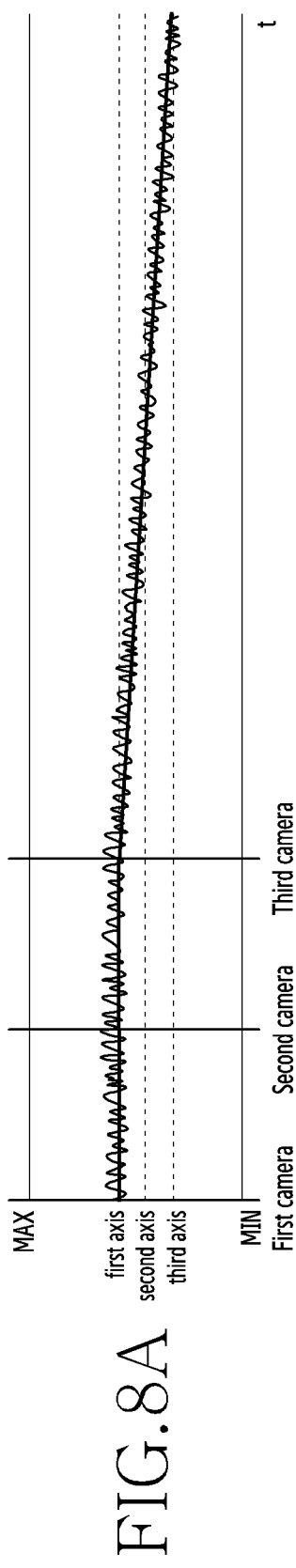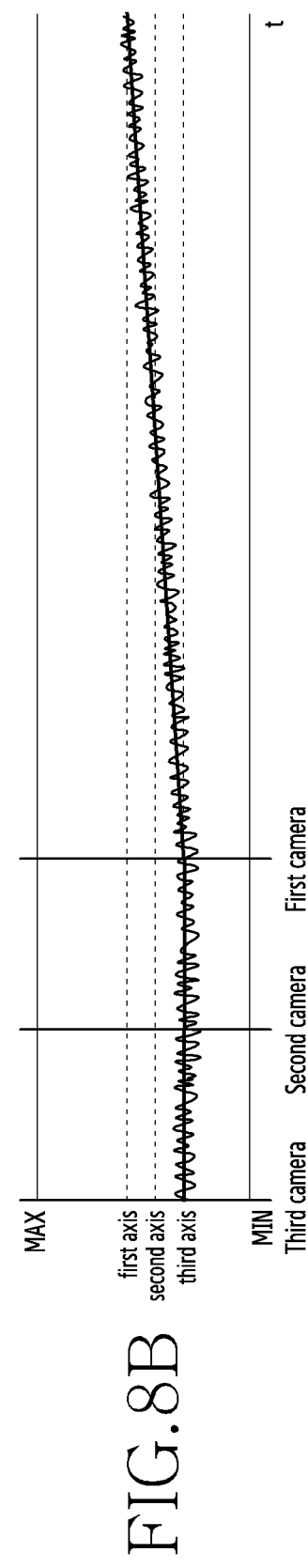

ELECTRONIC DEVICE INCLUDING CAMERA MODULE AND ELECTRONIC DEVICE OPERATING METHOD

CROSS-REFERENCE TO RELATED APPLICATION

This application is a bypass continuation application of International Application No. PCT/KR2022/002379, filed on Feb. 17, 2022, which is based on and claims priority to Korean Patent Application No. 10-2021-0037358, filed on Mar. 23, 2021, in the Korean Intellectual Property Office, the disclosures of which are incorporated by reference herein in their entireties.

BACKGROUND

1. Field

The disclosure relates to a technology capable of ensuring a reliable Optical Image Stabilization (OIS) driving range when switching a camera in an electronic device including a camera module.

2. Description of Related Art

Various technologies for acquiring a high-quality image are under development when a camera of an electronic device is used to obtain an image. For example, an improved image may be obtained by applying technologies such as zoom, Auto Focusing (AF), Auto Exposure (AE), Auto White Balance (AWB), and Optical Image Stabilization (OIS).

The electronic device may include a plurality of cameras having different field of views, and may obtain images corresponding to various field of views through switching between the cameras.

To stabilize an image obtained by performing operations such as zoom, AF, AE, AWB, and camera switching, the electronic device may simultaneously perform the operations and the OIS.

In the related art, when a plurality of cameras are assembled in an electronic device, an assembly deviation occurs between the plurality of cameras, and thus unnecessary disparity may occur between lenses.

According to the conventional technology, when the electronic device performs the OIS, a deviation occurs at centers of lenses which may result in a decrease in an OIS driving range when switching a camera.

SUMMARY

According to an aspect of the disclosure, an electronic device includes a first camera including a first lens and having a first field of view, a second camera including a second lens module and having a second field of view, a first Optical Image Stabilization (OIS) driver configured to move the first lens within a first OIS driving range; a second OIS driver configured to move the second lens within a second OIS driving range; and a processor electrically coupled to the first camera, the second camera, the first OIS driver, and the second OIS driver, and the processor is configured to: operate the first camera as a main camera; position a center of the first lens at a first point by controlling the first OIS driver; position a center of the second lens at a point on a first axis passing the first point by controlling the second OIS driver; detect an event of switching the main camera from the first camera to the second camera; based on the event of switching being detected, operate the second camera as the main camera; move a center of the second lens to a second point by controlling the second OIS driver; and move the center of the first lens to a point on the second axis parallel to the first axis and passing the second point by controlling the first OIS driver.

The processor may be further configured to maintain the center of the first lens to the first point while the main camera is switched from the first camera to the second camera.

The processor may be further configured to gradually move the center of the first lens to a point on the second axis passing the second point parallel to the first axis during a specific time period after the main camera is switched from the first camera to the second camera.

The processor may be further configured to identify the first point and the second point based on the first camera being operated as the main camera.

The processor may be further configured to identify the first point and the second point based on an image obtained by using the first camera and the second camera.

The electronic device may further include an OIS controller and the processor may be further configured to control the first OIS driver and the second OIS driver by using the OIS controller.

The electronic device may further include a memory configured to store information on the first point and the second point.

The electronic device may further include a sensor, and the processor may be further configured to: detect shaking of the electronic device by using the sensor; and perform OIS in a direction of suppressing the shaking.

The electronic device may further include a display, and the processor may be further configured to: detect an input through the display; identify a strength of the input; and based on the strength being greater than or equal to a threshold, perform OIS in a direction of suppressing shaking depending on the input.

The processor may be further configured to, based on the strength being less than or equal to the threshold, not to perform OIS on the first lens and the second lens.

According to an aspect of the disclosure, a method of operating an electronic device includes: operating a first camera of the electronic device as a main camera, positioning a center of a first lens included in the first camera at a first point by controlling a first Optical Image Stabilization (OIS) driver of the electronic device, positioning a center of a second lens included in a second camera of the electronic device to a point on a first axis passing the first point by controlling a second OIS driver of the electronic device, detecting an event of switching the main camera from the first camera to the second camera, based on the event of switching being detected, operating the second camera as the main camera, moving the center of the second lens to a second point by controlling the second OIS driver, and moving the center of the first lens to a point on a second axis parallel to the first axis and passing the second point by controlling the first OIS driver.

The method may further include maintaining the center of the first lens to the first point while the main camera is switched from the first camera to the second camera.

The method may further include gradually moving the center of the first lens to a point on the second axis passing the second point parallel to the first axis during a specific time period after the main camera is switched from the first camera to the second camera.

The method may further include identifying the first point and the second point based on an image obtained by using the first camera and the second camera.

The method further include detecting shaking of the electronic device by using a sensor of the electronic device; and performing OIS in a direction of suppressing the shaking.

The method may further include identifying the first point and the second point based on the first camera being operated as the main camera.

The method may further include controlling the first OIS driving module and the second OIS driving module by using an OIS control module of the electronic device.

Information on the first point and second point may be stored in a memory of the electronic device.

The electronic device further include a display, and the method may further include detecting an input through the display; identifying a strength of the input; and based on the strength being greater than or equal to a threshold, performing OIS in a direction of suppressing shaking depending on the input.

The method may further include, based on the strength being less than or equal to the threshold, not performing OIS on the first lens and the second lens.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8A and 8B are graphs illustrating a flow of arranging centers of lenses when an electronic device switches a camera, according to an embodiment;

DETAILED DESCRIPTION

Figure 1:
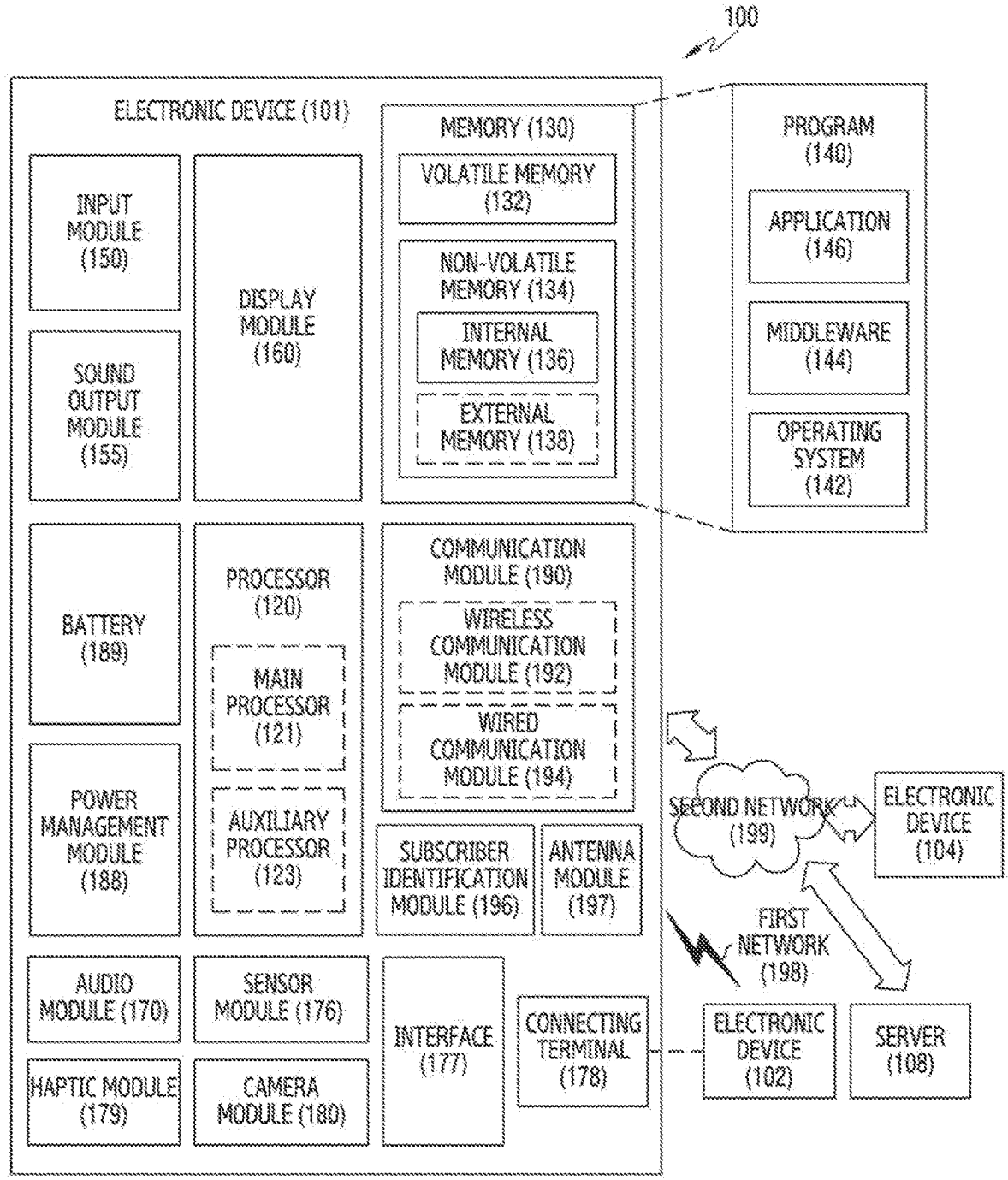
FIG. 1 is a block diagram of an electronic device in a network environment, according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
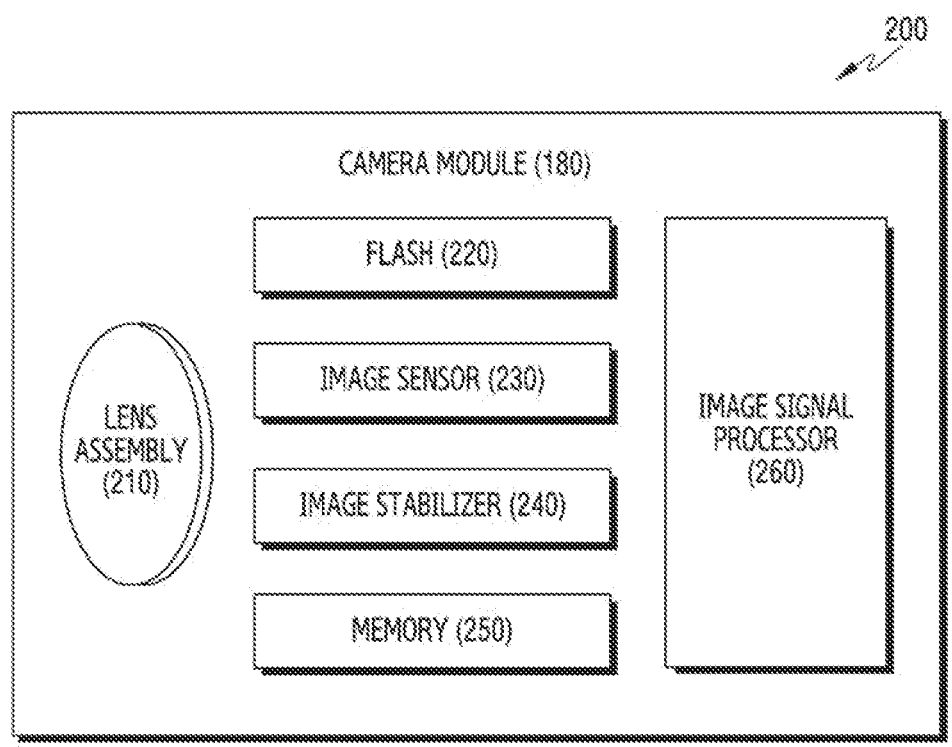
FIG. 2 is a block diagram illustrating a camera module, according to an embodiment.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly of the plurality of lens assemblies may have one or more lens attributes different from those of another lens assembly of the plurality of lens assemblies. The lens assembly 210 may include, for example, a wide-angle lens or a telephoto lens.

The flash 220 may emit light that is used to reinforce light reflected from the object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to the object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor or an acceleration sensor disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another one of the plurality of camera modules 180 may form a telephoto camera. Similarly, at least one of the plurality of camera modules 180 may form, for example, a front camera and at least another of the plurality of camera modules 180 may form a rear camera.

Figure 3:
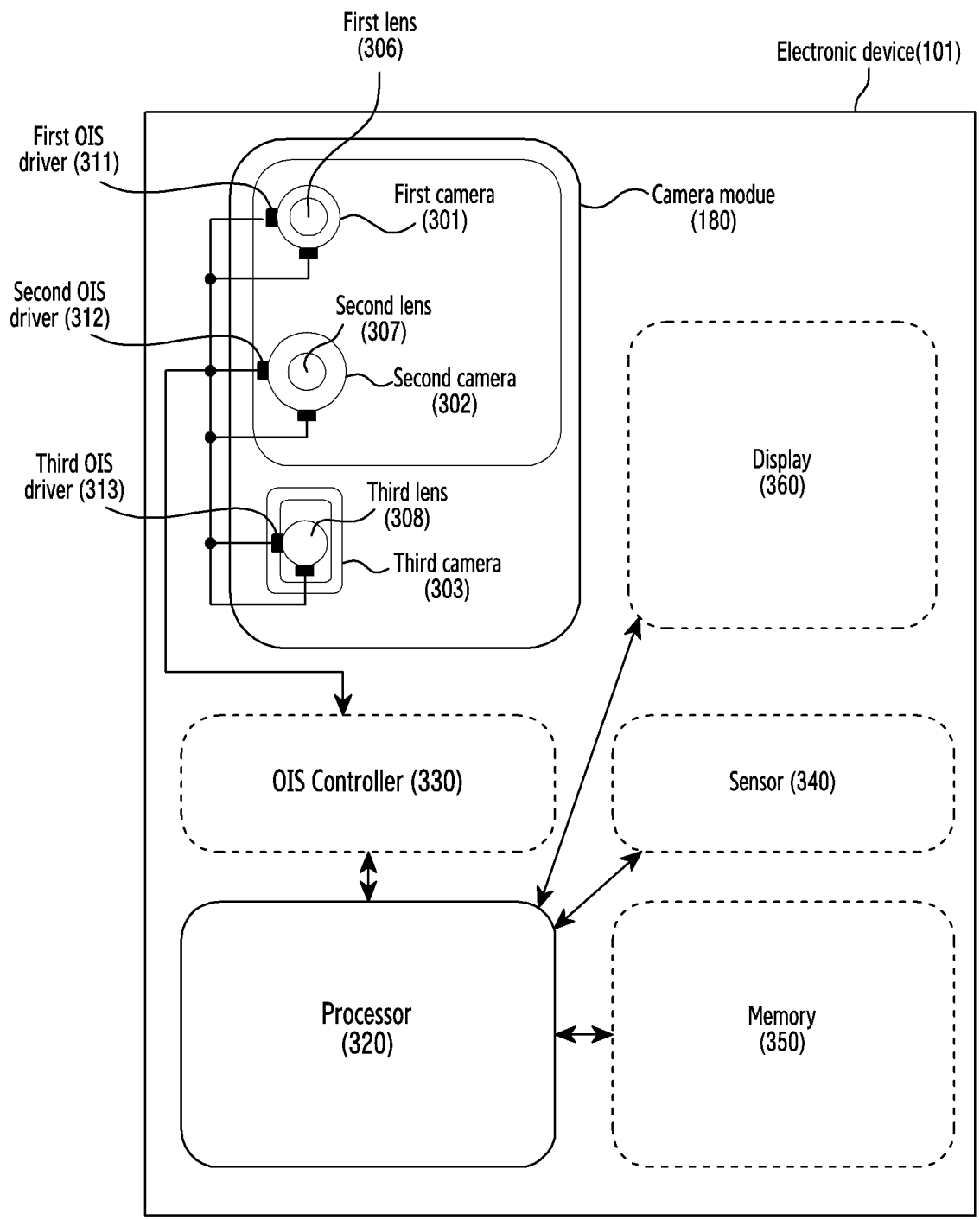
FIG. 3 illustrates a structure of an electronic device, according to an embodiment.

FIG. 3 briefly illustrates a structure of an electronic device, according to an embodiment.

According to an embodiment, an electronic device 101 may include at least a camera module 180 and a processor 320.

In an embodiment, the camera module 180 may include a plurality of cameras or camera modules. For example, the camera module 180 may include a first camera 301 having a first field of view, a second camera 302 having a second field of view, and/or a third camera 303 having a third field of view. The first camera, the second camera, and the third camera may be referred to the first camera module, the second camera module, and the third camera module, respectively.

In an embodiment, the first camera 301 may include a first lens 306 and a first OIS driver 311. For example, the first lens 306 may include at least one lens. The first OIS driver 311 may perform OIS by controlling a motion of the first lens 306 under the control of the processor 320 and/or an OIS controller 330. For example, the first OIS driver 311 may control the first lens 306 to move in a direction perpendicular to an optical axis. The first lens, the first OIS driver and the OIS controller may be referred to as the first lens module, the first OIS driving module and the OIS control module, respectively.

In an embodiment, the second camera 302 may include a second lens 307 and a second OIS driver 312. For example, the second lens 307 may include at least one lens. The second OIS driver 312 may perform OIS by controlling a motion of the second lens 307 under the control of the processor 320 and/or the OIS controller 330. For example, the second OIS driving module 312 may control the second lens 307 to move in a direction perpendicular to the optical axis. The second lens and the second OIS driver may be referred to as the second lens module and the second OIS driving module, respectively.

In an embodiment, the third camera 303 may include a third lens 308 and a third OIS driver 313. For example, the third lens 308 may include at least one lens. The third OIS driver 313 may perform OIS by controlling the motion of the third lens 308 under the control of the processor 320 and/or the OIS controller 330. For example, the third OIS driver 313 may control the third lens 308 to move in a direction perpendicular to the optical axis. The third lens and the third OIS driver may be referred to as the third lens module and the third OIS driving module, respectively.

In an embodiment, the processor 320 may control operations of the camera module 180 and components (e.g., the first camera 301, the second camera 302, the third camera 303, the first OIS driver 311, the second OIS driver 312, and the third OIS driver 313) included in the camera module 180.

In an embodiment, the processor 320 may control components (e.g., the first camera 301, the second camera 302, the third camera 303, the first OIS driver 311, the second OIS driver 312, and the third OIS driver 313 included in the camera module 180 through the OIS controller 330.

In an embodiment, the processor 320 may control operations of the OIS controller 330, a sensor 340, memory 350, and a display 360 described below.

According to an embodiment, the electronic device 101 may further include the OIS controller 330, the sensor 340, the memory 350, and the display 360.

In an embodiment, the OIS controller 330 may control each of the first OIS driver 311, the second OIS driver 312, and/or the third OIS driver 313 to control a motion of each of the first lens 306, the second lens 307, and/or the third lens 308.

In an embodiment, the sensor 340 may include a gyro sensor, an acceleration sensor, and/or a posture sensor. The sensor 340 may detect shaking of the electronic device 101 or external force (e.g., a touch input) applied to the electronic device 101.

In an embodiment, the memory 350 may store information on OIS (e.g., information on a position of the lens, an axis on which a center of the lens is disposed, a movement of the lens, and an OIS driving range) performed by the electronic device 101 and information (e.g., information on shaking and external force) detected through the sensor 340.

In an embodiment, the display 360 may display an image obtained by the electronic device 101 through a camera or a camera module (e.g., the camera module 180). In addition, the display 360 may obtain a user input (e.g., a touch input) and transfer the user input to the processor 320.

Figure 4A:
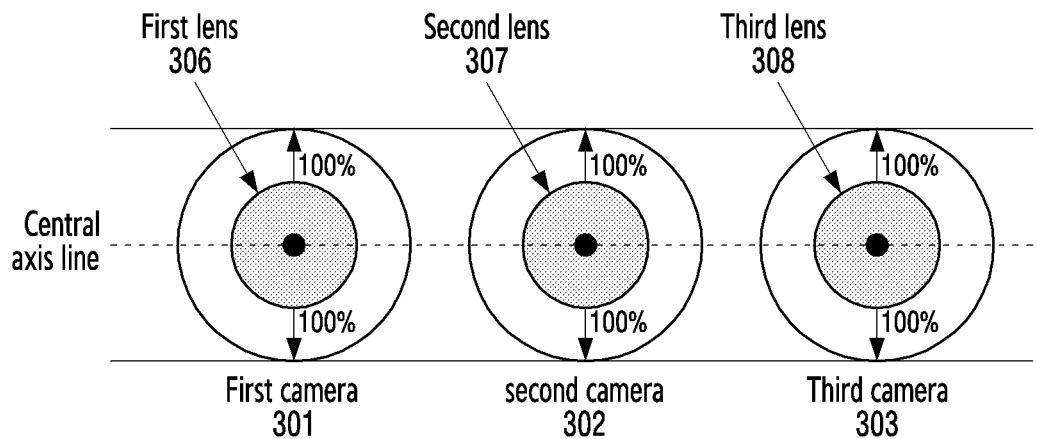
FIGS. 4A, 4B and 4C illustrate states where lens modules are arranged when an electronic device performs OIS, according to an embodiment.
Figure 4B:
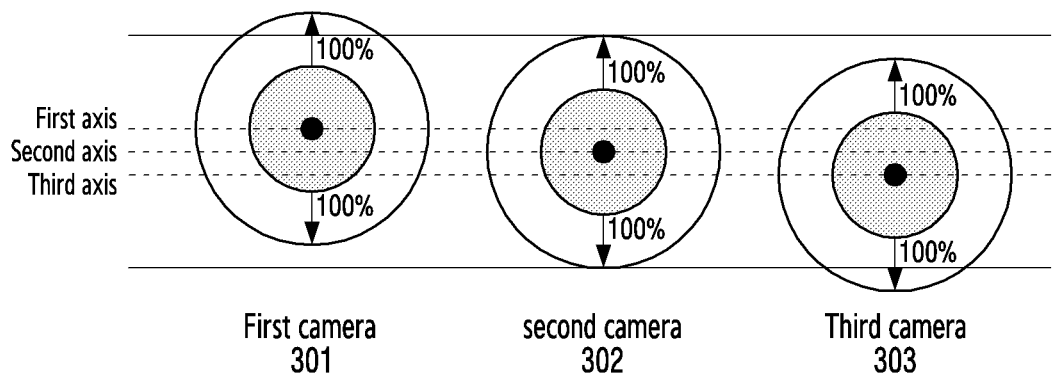
Figure 4C:
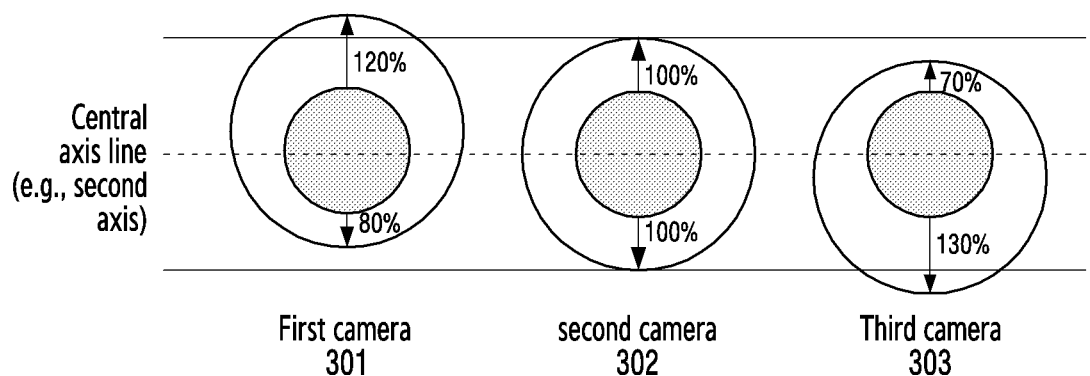

FIGS. 4A, 4B, and 4C illustrate states where lenses are arranged when an electronic device performs OIS, according to an embodiment.

According to an embodiment, FIG. 4A illustrates a state where ideal lenses (e.g., the first lens 306, the second lens 307, and the third lens 308) are arranged when an electronic device (e.g., the electronic device 101) performs the OIS.

In an embodiment, in an ideal case, a center of the first lens 306, a center of the second lens 307, and a center of the third lens 308 may be disposed side by side on a central axis line.

According to an embodiment, FIG. 4B illustrates a state where lenses (e.g., the first lens 306, the second lens 307, and the third lens 308) are arranged which may occur when an electronic device (e.g., the electronic device 101) performs OIS.

In an embodiment, in a process in which the electronic device 101 disposes the camera module 180, deviation may occur in the center of the lens between the first camera 301, the second camera 302, and the third camera 303. For example, the center of the first lens 306, the center of the second lens 307, and the center of the third lens 308 may be located at points respectively on a first axis, a second axis, and a third axis.

According to an embodiment, in FIG. 4C, an OIS driving range may be restricted when the deviation occurs in the center of the lens between the first camera 301, the second camera 302, and the third camera 303.

In an embodiment, referring to FIG. 4C, when the second camera 302 is operated or activated as a main camera, the OIS driving range may be reduced after the OIS is performed on the second lens 307.

Figure 5:
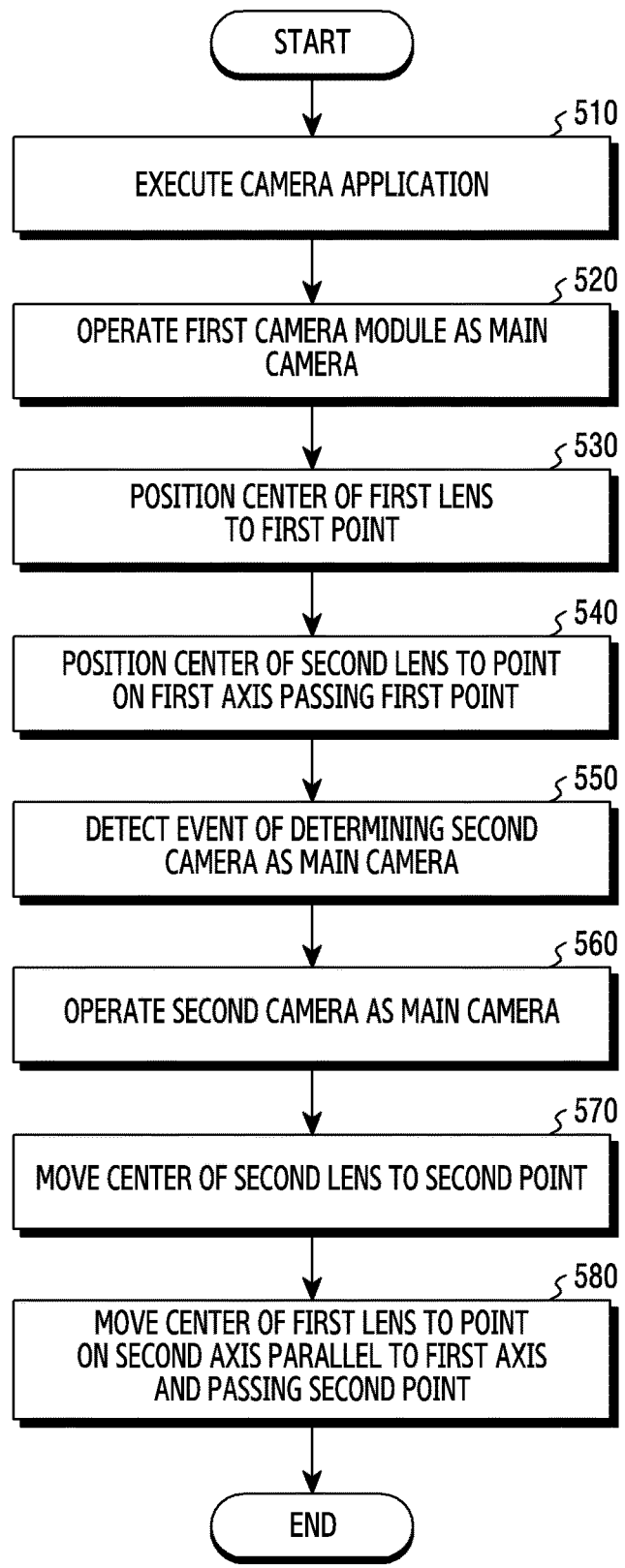
FIG. 5 is a flowchart illustrating a flow in which an electronic device arranges centers of lenses when an electronic device switches a camera, according to an embodiment.

FIG. 5 is a flowchart illustrating a flow in which an electronic device arranges centers of lenses when an electronic device switches a camera, according to an embodiment.

According to an embodiment, in operation 510, the electronic device (e.g., the electronic device 101) may execute a camera application under the control of a processor (e.g., the processor 320).

In an embodiment, upon detecting an event for executing an application, the electronic device 101 may execute the camera application under the control of the processor 320.

According to an embodiment, in operation 520, the electronic device (e.g., the electronic device 101) may operate or activate one camera (e.g., the first camera 301) as the main camera under the control of the processor (e.g., the processor 320).

In an embodiment, when the camera application is executed, the electronic device 101 may operate or active one camera (e.g., the first camera 301) as the main camera among a plurality of cameras (e.g., the first camera 301, the second camera 302, and the third camera 303), under the control of the processor 320.

According to an embodiment, in operation 530, the electronic device (e.g., the electronic device 101) may position a center of a first lens (e.g., the first lens 306) at a first point, under the control of the processor (e.g., the processor 320).

In an embodiment, the electronic device 101 may position a center of a lens (e.g., the first lens 306) included in one camera (e.g., the first camera 301) operated as the main camera at the first point, under the control of the processor 320.

In an embodiment, the first point may be a point at which an OIS driving range of one camera (e.g., the first camera 301) operated as the main camera is acquired or secured to the maximum extent. For example, the first point may be a center position of the first lens 306 corresponding to a center of the first field of view when an image is obtained through the first camera 301. As another example, the first point may be a center position of the first OIS driver 311 which physically implements the OIS of the first lens 306. As another example, the first point may be a center position in a range in which the first lens 306 is movable physically under the control of the first OIS driver 311. As another example, the first point may be a point corresponding to a center in a range in which the first lens 306 is movable to perform an OIS function.

In an embodiment, the electronic device 101 may identify the first point in advance under the control of the processor 320. For example, the electronic device 101 may identify a first point when a camera application is executed or may identify the first point when one camera is operated as the main camera, under the control of the processor 320.

According to an embodiment, in operation 540, the electronic device (e.g., the electronic device 101) may position a center of a second lens (e.g., the second lens 307) at a point on a first axis passing the first point, under the control of the processor (e.g., the processor 320).

In an embodiment, the electronic device 101 may position a center of a lens (e.g., the second lens 307) included in one camera (e.g., the second camera 302) not operated as the main camera at a point on the first axis passing the first point, under the control of the processor 320. For example, the first axis may represent an axis perpendicular to an optical axis and parallel to a direction in which the first camera 301, the second camera 302, and the third camera 303 are arranged.

In an embodiment, the electronic device 101 may identify in advance a point on the first axis passing the first point, under the control of the processor 320. For example, the electronic device 101 may identify the point on the first axis passing the first point when the camera application is executed, or may identify the point on the first axis passing the first point when one camera is operated as the main camera, under the control of the processor 320.

According to an embodiment, in operation 550, the electronic device (e.g., the electronic device 101) may detect an event of determining the second camera (e.g., the second camera 302) as the main camera, under the control of the processor (e.g., the processor 320).

In an embodiment, the electronic device 101 may detect an event of switching the main camera, under the control of the processor 320. For example, the event of switching the main camera may be an input which requests for changing a user or may be an automatic event which responds to a change in a field of view. The event of switching the main camera may include an event of changing a zoom magnification.

According to an embodiment, in operation 560, the electronic device (e.g., the electronic device 101) may operate the second camera (e.g., the second camera 302) as the main camera, under the control of the processor (e.g., the processor 320).

In an embodiment, the electronic device 101 may enable another camera (e.g., the second camera 302) as the main camera, in response to detecting of the event of switching the main camera, under the control of the processor 320.

According to an embodiment, in operation 570, the electronic device (e.g., the electronic device 101) may move a center of the second lens (e.g., the second lens 307 to the second point, under the control of the processor (e.g., the processor 320).

In an embodiment, the electronic device 101 may move a center of the lens 307 included in the switched main camera (e.g., the second camera 302) to the second point, under the control of the processor 320.

In an embodiment, the second point may be a point capable of acquiring or securing an OIS driving range of the camera (e.g., the second camera 302) operated as the main camera to the maximum extent. For example, the second point may be a center position of the second lens 307 corresponding to a center of a second field of view when an image is obtained through the second camera 302. As another example, the second point may be a center point of the second OIS driver 312 which physically implements OIS of the second lens 307. As another example, the second point may be a center point in a range in which the second lens 307 is physically movable under the control of the second OIS driver 312. As another example, the second point may be a point corresponding to a center in a range in which the second lens 307 is movable to perform an OIS function.

In an embodiment, the electronic device 101 may identify in advance the second point, under the control of the processor 320. For example, under the control of the processor 320, the electronic device 101 may identify the second point when a camera application is executed, may identify the second point when one camera (e.g., the first camera 301) is operated as the main camera, and may identify the second point in response to detecting of the event of switching the main camera to the second camera 302.

According to an embodiment, in operation 580, the electronic device (e.g., the electronic device 101) may move a center of the first lens (e.g., the first lens 306) to a point on the second axis parallel to the first axis and passing the second point, under the control of the processor (e.g., the processor 320).

In an embodiment, the electronic device 101 may move the center of the first lens 306 located at the first point to a point on the second axis parallel to the first axis and passing the identified second point, under the control of the processor 320. For example, the second axis represents an axis perpendicular to the optical axis and parallel to a direction in which the first camera 301, the second camera 302, and the third camera 303 are arranged. In addition, for example, the second axis may be parallel to the first axis.

In an embodiment, when moving the center of the first lens 306 to a point on the second axis parallel to the first axis and passing the second point, under the control of the processor 320, the electronic device 101 may move the center of the first lens 306 gradually during a specific time period.

In an embodiment, the electronic device 101 may maintain the center of the first lens 306 to a position of the first point while switching the main camera to the second camera 302 in response to detecting the event of switching the main camera to the second camera 302 under the control of the processor 320.

In an embodiment, the electronic device 101 may move the center of the first lens 306 to a point on the second axis parallel to the first axis and passing the identified second point, after switching the main camera to the second camera 302 in response to detecting the event of switching the main camera to the second camera 302, under the control of the processor 320.

In an embodiment, the aforementioned description on the operations of the electronic device 101 may not be limited to the first lens 306 included in the first camera 301 and the second lens 307 included in the second camera 302.

In an embodiment, the aforementioned description on the operations of the electronic device 101 may also be applied to the first lens 306 included in the first camera 301, the second lend 307 included in the second camera 302, and the third lens 308 included in the third camera 303. This will be described below in detail with reference to FIG. 6.

Figure 6A:
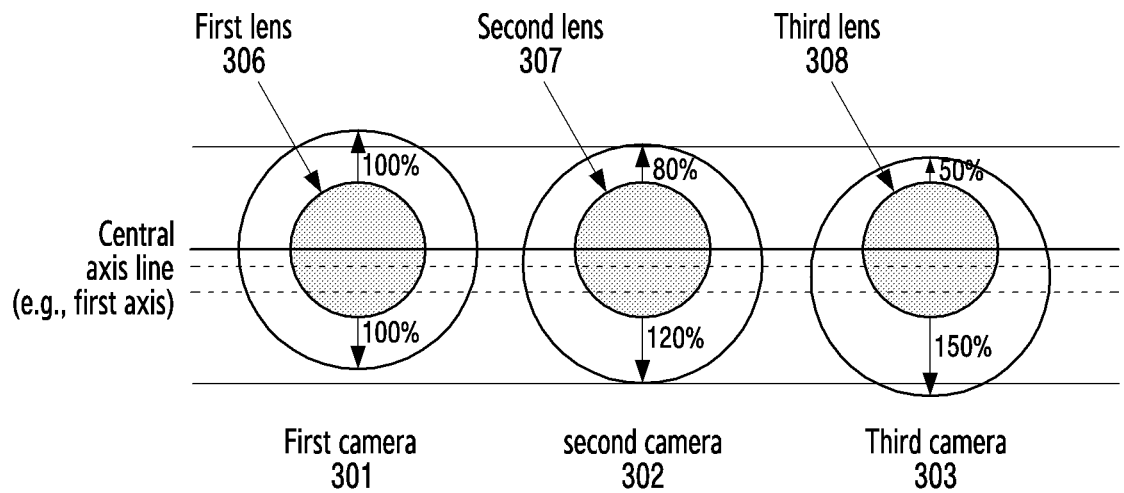
FIGS. 6A, 6B and 6C illustrate states where centers of lens modules are arranged when an electronic device switches a camera, according to an embodiment.
Figure 6B:
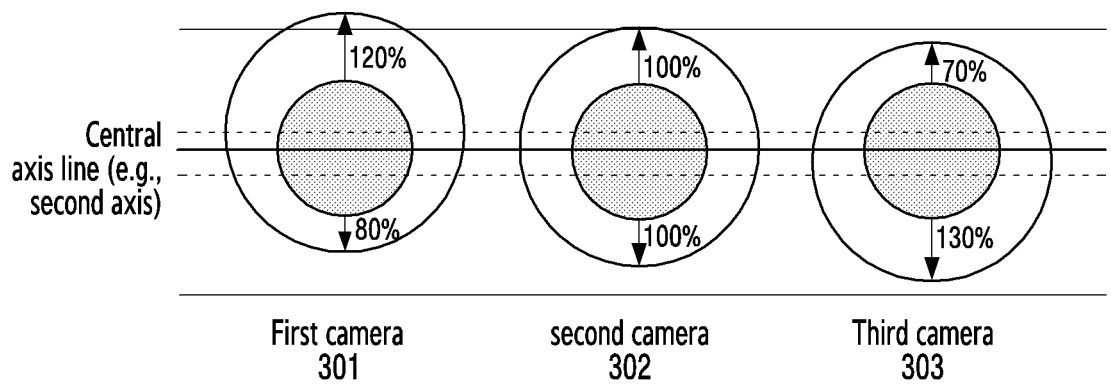
Figure 6C:
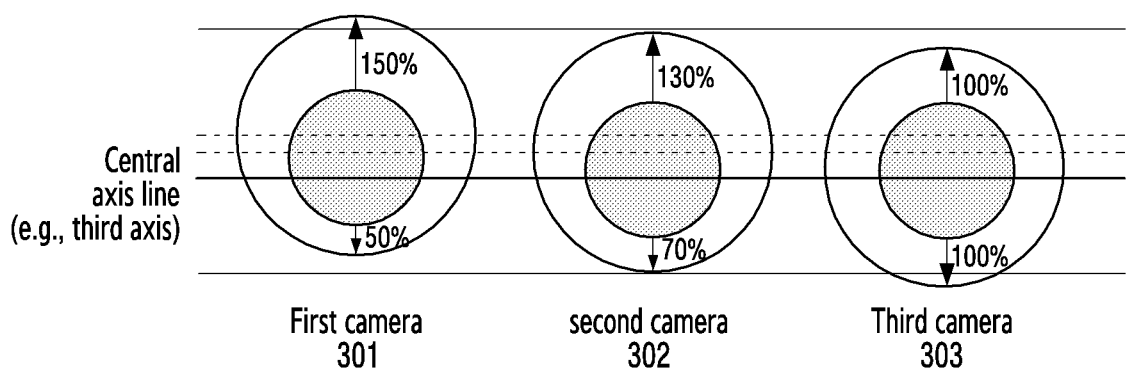

FIGS. 6A-6C illustrate states where centers of lenses are arranged when an electronic device switches a camera, according to an embodiment.

According to an embodiment, referring to FIG. 6A, when the first camera 301 is operated as a main camera, the electronic device 101 may move centers of the second lens 307 and the third lens 308 on a first axis passing a first point at which a center of the first lens 306 is located, under the control of the processor 320.

According to an embodiment, referring to FIG. 6B, when the second camera 302 is operated as the main camera, the electronic device 101 may move centers of the first lens 306 and the third lens 308 on a second axis passing a second point at which a center of the second lens 307 is located, under the control of the processor 320.

According to an embodiment, referring to FIG. 6C, when the third camera 303 is operated as the main camera, the electronic device 101 may move centers of the first lens 306 and the second lens 307 on a third axis passing a third point at which a center of the third lens 308 is located, under the control of the processor 320.

Figure 7A:
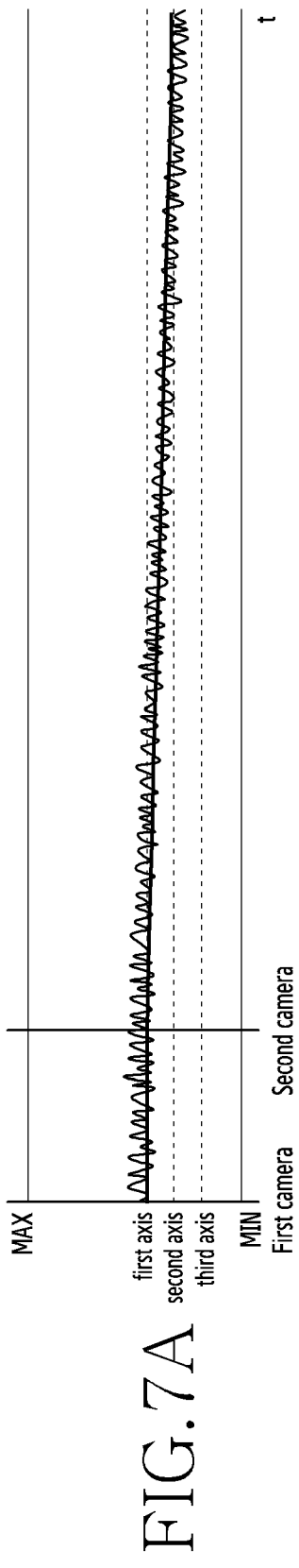
FIGS. 7A, 7B and 7C are graphs illustrating a flow of arranging centers of lenses when an electronic device switches a camera, according to an embodiment.
Figure 7B:
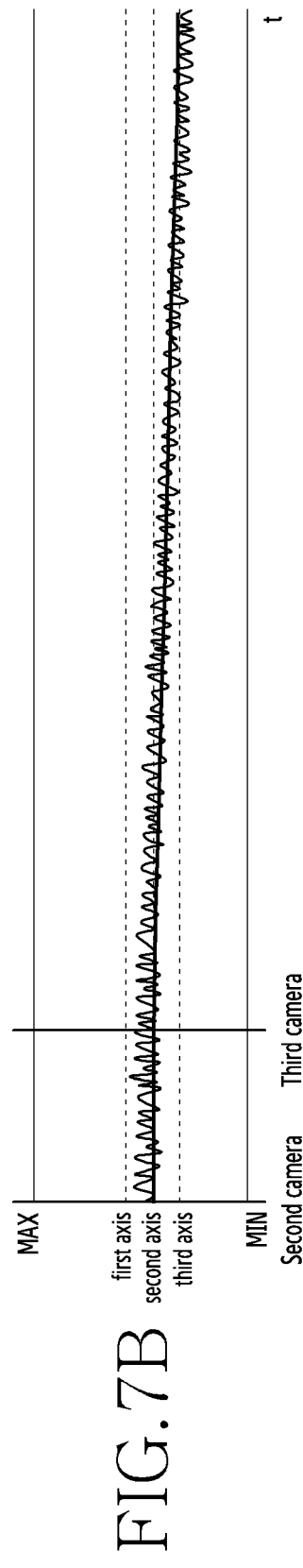
Figure 7C:
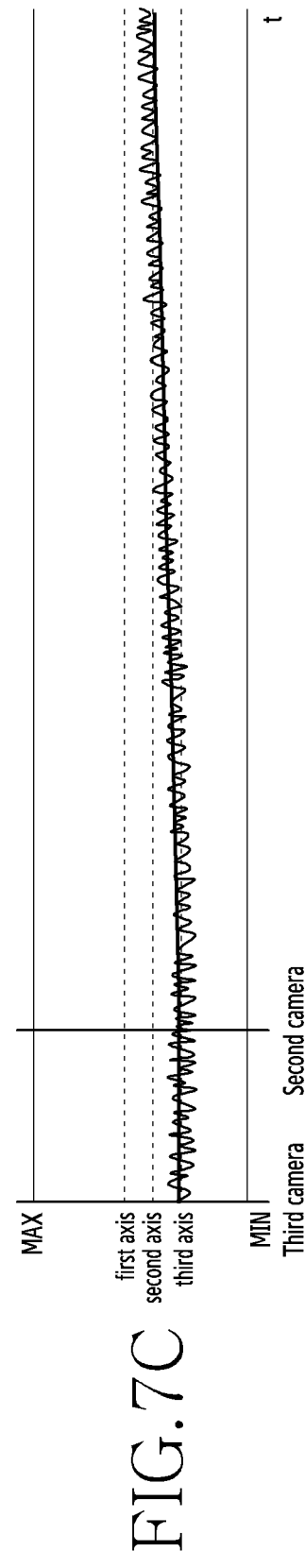

FIGS. 7A, 7B, and 7C are graphs illustrating a flow of arranging centers of lens modules when an electronic device switches a camera, according to an embodiment.

According to an embodiment, FIG. 7A illustrates center positions of lenses over time, when a main camera is switched from a first camera (e.g., the first camera 301) having a first field of view to a second camera (e.g., the second camera 302) having a second field of view.

In an embodiment, the electronic device 101 may enable the first camera 301 as the main camera, under the control of the processor 320.

In an embodiment, the electronic device 101 may position the center of the first lens 306 of the first camera 301 at the first point, under the control of the processor 320.

In an embodiment, the electronic device 101 may position the center of the second lens 307 of the second camera 302 at a point on the first axis passing the first point, under the control of the processor 320.

In an embodiment, upon detecting an event of switching the main camera from the first camera 301 to the second camera 302, the electronic device 101 may switch the main camera to the second camera 302 in response to the detection of the event, under the control of the processor 320.

In an embodiment, the electronic device 101 may maintain the center of the first lens 306 included in the first camera 301 to a position of the first point, while switching the main camera to the second camera 302, under the control of the processor 320.

In an embodiment, after the main camera is switched to the second camera 302, the electronic device 101 may move the center of the first lens 306 included in the first camera 301 from a position of the first point to a position on the second axis passing the second point gradually during a specific time period, under the control of the processor 320.

According to an embodiment, FIG. 7B illustrates center positions of lenses over time, when a main camera is switched from a second camera (e.g., the second camera 302) having a second field of view to a third camera (e.g., the third camera 303) having a third field of view.

In an embodiment, the electronic device 101 may operate the second camera 302 as the main camera, under the control of the processor 320.

In an embodiment, the electronic device 101 may position the center of the second lens 307 of the second camera 302 at the second point, under the control of the processor 320.

In an embodiment, the electronic device 101 may position the center of the first lens 306 of the first camera 301 at a point on a second axis passing the second point, under the control of the processor 320.

In an embodiment, upon detecting an event of switching the main camera from the second camera 302 to the third camera 303, the electronic device 101 may switch the main camera to the third camera 303 in response to the detection of the event, under the control of the processor 320.

In an embodiment, the electronic device 101 may maintain the center of the second lens module 307 included in the second camera 302 to a position of the second point, while switching the main camera to the third camera 303, under the control of the processor 320.

In an embodiment, after the main camera is switched to the third camera 303, the electronic device 101 may move the center of the second lens 307 included in the second camera 302 from a position of the second point to a position on the third axis passing the third point gradually during a specific time period, under the control of the processor 320.

According to an embodiment, FIG. 7C illustrates center positions of lenses over time, when a main camera is switched from a third camera (e.g., the third camera 303) having a third field of view to a second camera (e.g., the second camera 302) having a second field of view.

In an embodiment, the electronic device 101 may operate the third camera 303 as the main camera, under the control of the processor 320.

In an embodiment, the electronic device 101 may position the center of the third lens 308 of the third camera 303 at the third point, under the control of the processor 320.

In an embodiment, the electronic device 101 may position the center of the second lens 307 of the second camera 302 at a point on a third axis passing the third point, under the control of the processor 320.

In an embodiment, upon detecting an event of switching the main camera from the third camera 303 to the second camera 302, the electronic device 101 may switch the main camera to the second camera 302 in response to the detection of the event, under the control of the processor 320.

In an embodiment, the electronic device 101 may maintain the center of the third lens 308 included in the third camera 303 to a position of the third point, while switching the main camera to the second camera 302, under the control of the processor 320.

In an embodiment, after the main camera is switched to the second camera 302, the electronic device 101 may move the center of the third lens 308 included in the third camera 303 from a position of the third point to a position on the second axis passing the second point gradually during a specific time period, under the control of the processor 320.

The aforementioned embodiments are not limited to FIG. 7A to FIG. 7C, and other embodiments may exist when switching a camera.

FIG. 8 is a graph illustrating a flow of arranging centers of lenses when an electronic device switches a camera, according to an embodiment.

According to an embodiment, FIG. 8A illustrates center positions of lenses over time, when a main camera is switched from a first camera (e.g., the first camera 301) having a first field of view to a third camera (e.g., the third camera 303) having a third field of view.

In an embodiment, the electronic device 101 may operate the first camera 301 as the main camera, under the control of the processor 320.

In an embodiment, the electronic device 101 may position the center of the first lens 306 included in the first camera 301 at the first point, under the control of the processor 320.

In an embodiment, the electronic device 101 may position the center of the second lens 307 included in the second camera 302 and the center of the third lens 308 included in the third camera 303 on a first axis passing the first point, under the control of the processor 320.

In an embodiment, the electronic device 101 may operate the third camera 303 as the main camera, upon detecting an event of switching the main camera to the third camera 303, under the control of the processor 320.

In an embodiment, the electronic device 101 may move a center of the third lens 308 of the third camera 303 to a third point, under the control of the processor 320.

In an embodiment, the electronic device 101 may maintain the center of the first lens 306 included in the first camera 301 and the center of the second lens 307 included in the second camera 302 to a position on the first axis passing the first point, while switching the main camera to the third camera 303, under the control of the processor 320.

In an embodiment, after the main camera is switched to the second camera 302, the electronic device 101 may move the center of the third lens 308 included in the third camera 303 from a position on the first axis passing the first point to a position on the third axis passing the third point gradually during a specific time period, under the control of the processor 320.

According to an embodiment, FIG. 8B illustrates center positions of lenses over time, when a main camera is switched from a third camera (e.g., the third camera 303) having a third field of view to a first camera (e.g., the first camera 301) having a first field of view.

In an embodiment, the electronic device 101 may operate the third camera 303 as the main camera, under the control of the processor 320.

In an embodiment, the electronic device 101 may position the center of the third lens 308 of the third camera 303 at the third point, under the control of the processor 320.

In an embodiment, the electronic device 101 may position the center of the first lens 306 included in the first camera 301 and the center of the second lens 307 included in the second camera 302 on the third axis passing the third point, under the control of the processor 320.

In an embodiment, upon detecting an event of switching the main camera to the first camera 301, the electronic device 101 may operate the first camera 301 as the main camera.

In an embodiment, the electronic device 101 may move the center of the first lens 306 of the first camera 301 to the first point, under the control of the processor 320.

In an embodiment, the electronic device 101 may maintain the center of the second lens 307 included in the second camera 302 and the center of the third lens 308 included in the third camera 303 to a position on the third axis passing the third point, under the control of the processor 320.

In an embodiment, after the main camera is switched to the first camera 301, the electronic device 101 may move the center of the second lens 307 included in the second camera 302 and the center of the third lens 308 included in the third camera 303 from a position on the third axis passing the third point to a position on the first axis passing the first point gradually during a specific time period, under the control of the processor 320.

Figure 9:
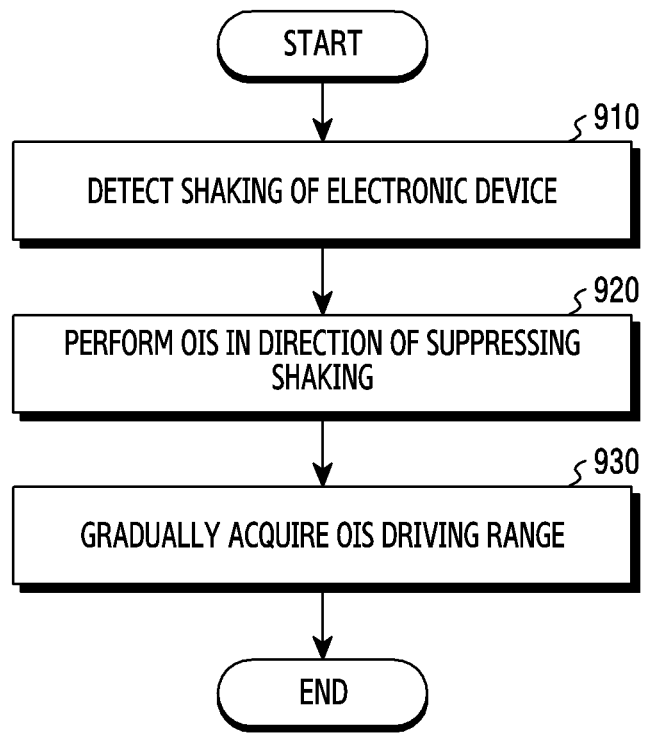
FIG. 9 is a flowchart illustrating a flow of acquiring an OIS driving range when an electronic device detects shaking, according to an embodiment.

FIG. 9 is a flowchart illustrating a flow of acquiring an OIS driving range when an electronic device detects shaking, according to an embodiment.

According to an embodiment, in operation 910, the electronic device (e.g., the electronic device 101) may detect shaking of the electronic device (e.g., the electronic device 101), under the control of a processor (e.g., the processor 320).

In an embodiment, the electronic device 101 may detect the shaking of the electronic device 101, based on the sensor 340, under the control of the processor 320.

According to an embodiment, in operation 920, the electronic device (e.g., the electronic device 101) may perform OIS in a direction of suppressing shaking, under the control of the processor (e.g., the processor 320).

In an embodiment, in order to suppress shaking of lenses (e.g., the first lens 306, the second lens 307, and the third lens 308), the electronic device 101 may control OIS drivers (e.g., the first OIS driver 311, the second OIS driver 312, and the OIS driver 313) to perform OIS in a direction of suppressing (or absorbing) the shaking, under the control of the processor 320. For example, the electronic device may move the lenses (e.g., the first lens 306, the second lens 307, and the third lens 308) in a direction of suppressing the shaking of the electronic device 101, under the control of the processor 320.

According to an embodiment, in operation 930, the electronic device (e.g., the electronic device 101) may gradually acquire the OIS driving range, under the control of the processor (e.g., the processor 320).

In an embodiment, after performing OIS according to the operation 920, the electronic device 101 may identify center positions of lenses (e.g., the first lens 306, the second lens 307, and the third lens 308), under the control of the processor 320.

In an embodiment, under the control of the processor 320, the electronic device 101 may identify center positions of lenses (e.g., the first lens 306, the second lens 307, and the third lens 308) to maintain the identified positions when a distance to a center of a lens (e.g., the first lens 306, the second lens 307, and the third lens 308) included in a camera (e.g., the first camera 301, the second camera 302, and the third camera 303) operated as the main camera is decreased.

In an embodiment, under the control of the processor 320, upon detecting an event for switching the main camera, the electronic device 101 may acquire an OIS driving range by gradually moving it from the maintained identified position to a point on an axis passing the center of the lens (e.g., the first lens 306, the second lens 307, and the third lens 308) included in the camera (e.g., the first camera 301, the second camera 302, and the third camera 303) operated as the main camera.

FIGS. 10A to 10D are graphs illustrating a flow of acquiring an OIS driving range when an electronic device detects shaking, according to an embodiment.

According to an embodiment, FIG. 10A to FIG. 10D illustrate center positions of lenses over time, when the electronic device 101 detects shaking while a main camera is switched.

Figure 10A:
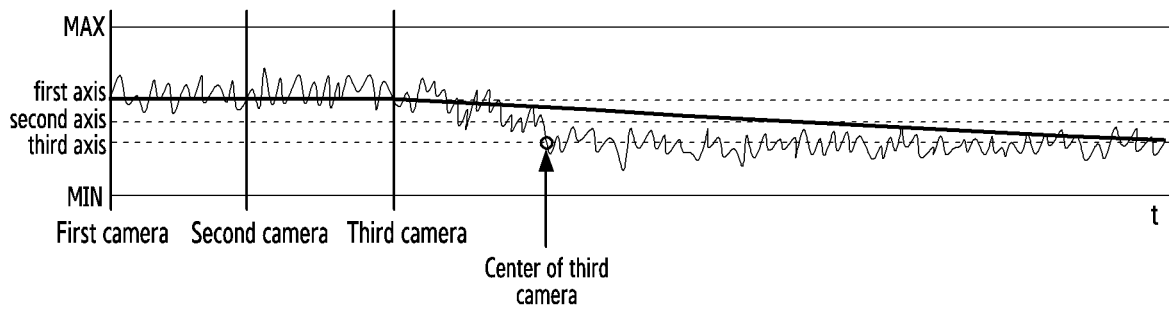
FIGS. 10A-10D are graphs illustrating a flow of acquiring an OIS driving range when an electronic device detects shaking, according to an embodiment.

In an embodiment, referring to FIG. 10A, when the main camera is switched from the first camera 301 to the third camera 303, the electronic device 101 may detect shaking under the control of the processor 320.

In an embodiment, under the control of the processor 320, the electronic device 101 may perform OIS in a direction of suppressing (or absorbing) the shaking, with respect to the first lens 306 of the first camera 301 and/or the second lens 307 of the second camera 302.

In an embodiment, under the control of the processor 320, when a distance to a point on a third axis passing a center (e.g., a third point) of the third lens 308 included in the third camera 303 operated as the main camera is decreased, the electronic device may maintain center positions of the first lens 306 of the first camera 301 and/or the second lens 307 of the second camera 302 which are moved by performing OIS in a direction of suppressing (or absorbing) shaking.

In an embodiment, under the control of the processor 302, the electronic device 101 may acquire an OIS driving range by gradually moving the center of the first lens 306 and/or the center of the second lens 307 from the maintained center position to a point on a third axis passing the center (e.g., the third point) of the third lens 308 included in the third camera 303 operate as the main camera.

Figure 10B:
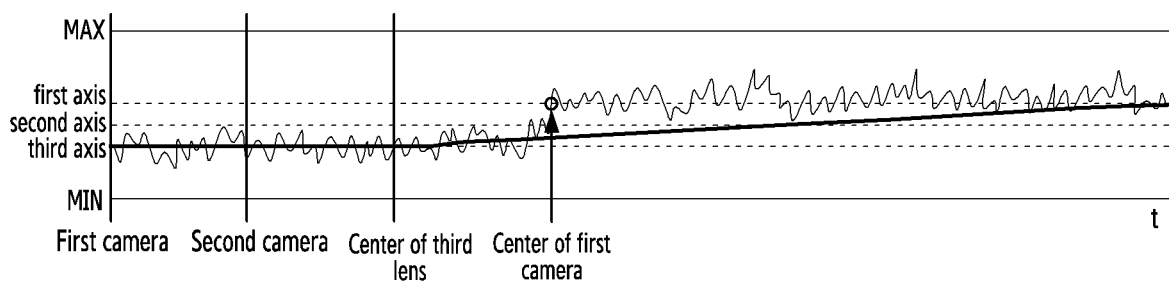

In an embodiment, referring to FIG. 10B, when the main camera is switched from the third camera 303 to the first camera 301, the electronic device 101 may detect shaking under the control of the processor 320.

In an embodiment, under the control of the processor 320, the electronic device 101 may perform OIS in a direction of suppressing (or absorbing) the shaking, with respect to the second lens 307 of the second camera 302 and/or the third lens 308 of the third camera 303.

In an embodiment, under the control of the processor 320, when a distance to a point on the first axis passing a center (i.e., the first point) of the first lens 306 included in the first camera 301 operated as the main camera is decreased, the electronic device 101 may maintain center positions of the second lens 307 of the second camera 302 and/or the third lens 308 of the third camera 303 which are moved by performing OIS in a direction of suppressing (or absorbing) shaking.

In an embodiment, under the control of the processor 320, the electronic device 101 may acquire an OIS driving range by gradually moving the center of the second lens 307 and/or the center of the third lens 308 from the maintained center position to a point on a first axis passing the center (e.g., the first point) of the first lens 306 included in the first camera 301 operated as the main camera.

Figure 10C:
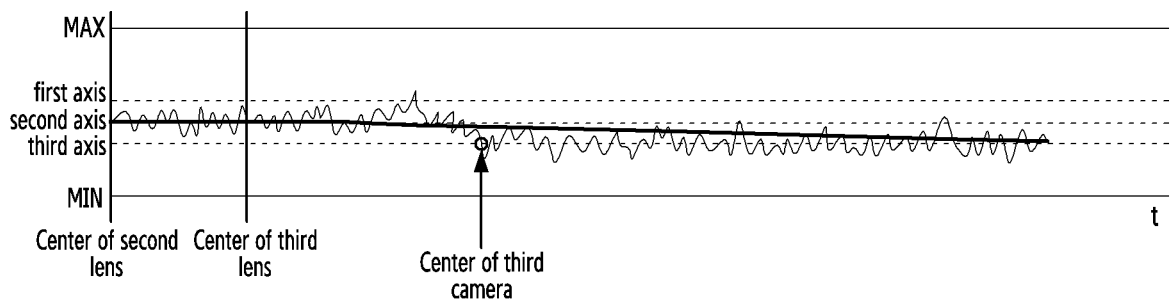
Figure 10D:
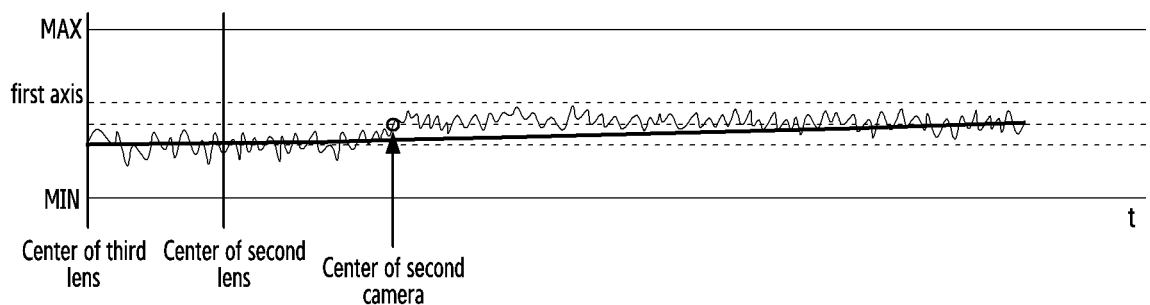

In an embodiment, FIG. 10C is a graph illustrating a flow when shaking of the electronic device 101 is detected while a main camera is switched from the second camera module 302 to the third camera 303 and FIG. 10D is a graph illustrating a flow when shaking of the electronic device 101 is detected while the main camera is switched from the third camera 303 to the second camera 302. According to an embodiment, the same or similar description on operations of FIG. 10-1 and FIG. 10-2 may be applied to the flow of FIG. 10C and FIG. 10D.

Figure 11:
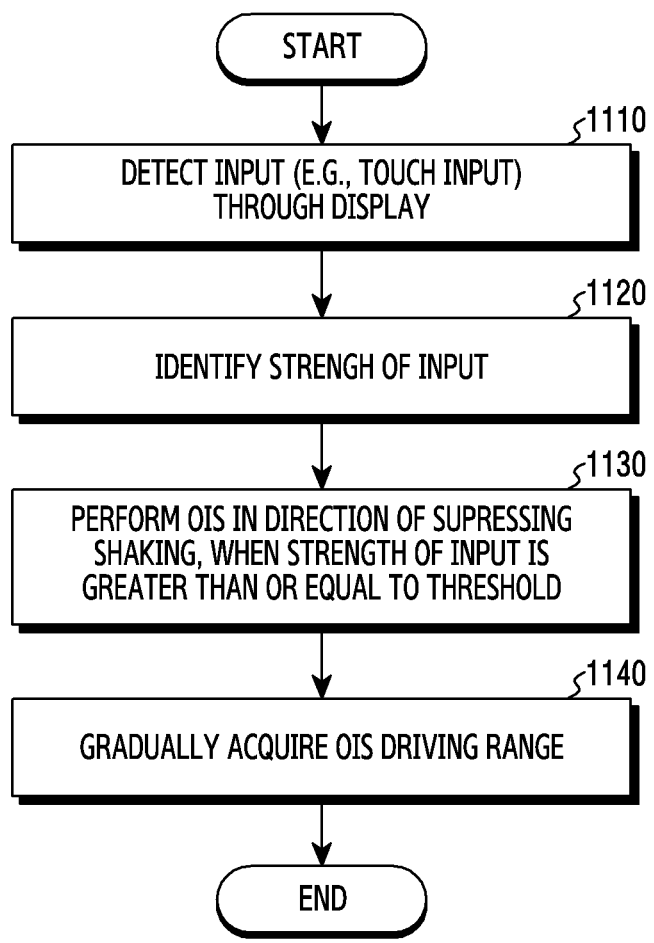
FIG. 11 is a flowchart illustrating a flow of acquiring an OIS driving range when an electronic device detects an input (e.g., a touch input), according to an embodiment.

FIG. 11 is a flowchart illustrating a flow of acquiring an OIS driving range when an electronic device detects an input (e.g., a touch input), according to an embodiment.

According to an embodiment, in operation 1110, the electronic device (e.g., the electronic device 101) may detect the input (e.g., the touch input) through a display (e.g. the display 160), under the control of a processor (e.g., the processor 320).

In an embodiment, the electronic device 101 may detect a user input (e.g., a touch input) through the display 160, under the control of the processor 320. The touch input may be an input of switching a main camera, or may be an input of touching a user interface such as an icon displayed on the display 160.

According to an embodiment, in operation 1120, the electronic device (e.g., the electronic device 101) may identify strength of an input, under the control of the processor (e.g., the processor 320).

In an embodiment, the electronic device 101 may identify strength of a user input (e.g., a touch input) detected through the display 160, under the control of the processor 320. For example, the electronic device 101 may determine that the input is a strong input when the strength of the input is greater than or equal to a threshold, and may determine that the input is a weak input when the strength of the input is less than or equal to the threshold.

In an embodiment, the electronic device 101 may not perform OIS or may maintain centers of lenses when it is determined that the strength of the input is the weak input less than or equal to the threshold, under the control of the processor 320.

According to an embodiment, in operation 1130, the electronic device (e.g., the electronic device 101) may perform OIS in a direction of suppressing shaking of the electronic device 101 when the strength of the input is greater than or equal to the threshold, under the control of the processor (e.g., the processor 320).

In an embodiment, the electronic device 101 may perform OIS in a direction of suppressing shaking of the electronic device 101 depending on an input, when it is determined that the strength of the input is the strong input greater than or equal to the threshold, under the control of the processor 320.

According to an embodiment, in operation 1140, the electronic device (e.g., the electronic device 101) may gradually acquire an OIS driving range, under the control of the processor (e.g., the processor 320).

In an embodiment, the electronic device 101 may maintain a center position of a lens of another camera moved by performing OIS in a direction of suppressing (or absorbing) shaking when a distance to a point on an axis passing a center or a lens included in a camera operated as the main camera, under the control of the processor 320.

In an embodiment, the electronic device 101 may acquire the OIS driving range by gradually moving a center of another lens from the maintained center position to a point on an axis passing a center of a lens included in the camera operated as the main camera, under the control of the processor 320.

Figure 12A:
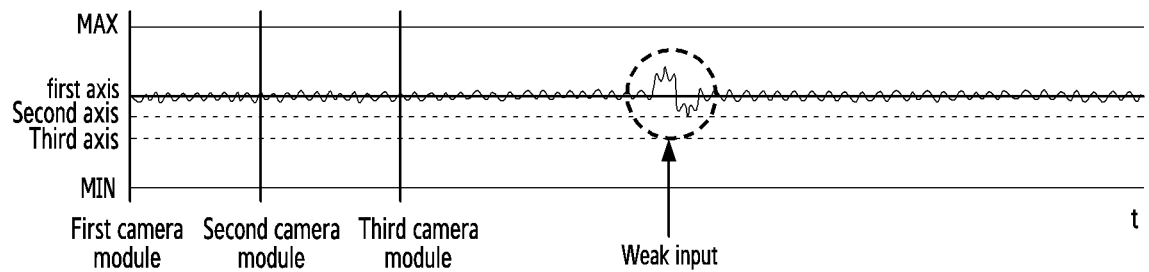
FIGS. 12A and 12B are graphs illustrating a flow of acquiring an OIS driving range when an electronic device detects an input (e.g., a touch input), according to an embodiment.
Figure 12B:
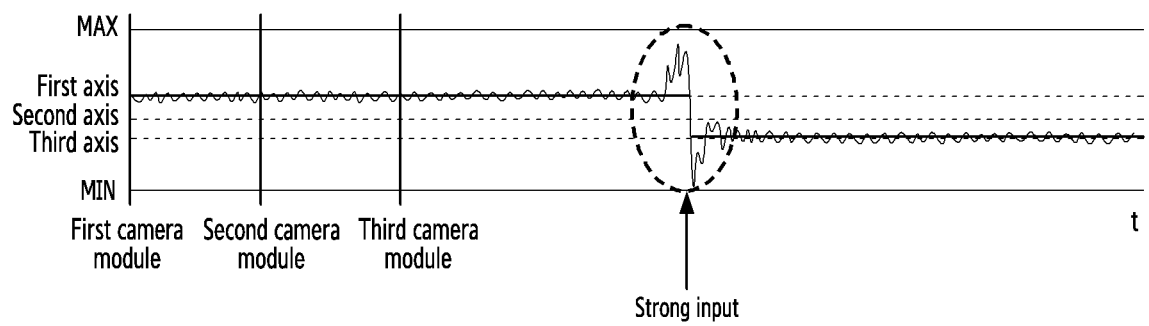

FIGS. 12A and 12B are graphs illustrating a flow of acquiring an OIS driving range when an electronic device detects an input (e.g., a touch input), according to an embodiment.

According to an embodiment, FIG. 12A is a graph illustrating a state where OIS is not performed or centers of lenses are not moved, when the electronic device 101 determines that a detected input is a weak input under the control of the processor 320.

According to an embodiment, FIG. 12B is a graph illustrating a state where OIS is performed, or centers of lenses are moved when the electronic device 101 determines that the detected input is a strong input under the control of the processor 320.

In an electronic device (e.g., the electronic device 101) according to an embodiment, the electronic device (e.g., the electronic device 101) may include a first camera (e.g., the first camera 301) including a first lens (e.g., the first lens 306) and having a first field of view, a second camera (e.g., the second camera 302) including a second lens (e.g., the second lens 307) and having a second field of view, a first Optical Image Stabilization (OIS) driver (e.g., the first OIS driver 311) which moves the first lens (e.g., the first lens module 306) within a first OIS driving range, a second OIS driver (e.g., the second OIS driver 312) which moves the second lens (e.g., the second lens 307) within a second OIS driving range, and a processor (e.g., the processor 320) electrically coupled to the first camera (e.g., the first camera 301), the second camera (e.g., the second camera 302), the first OIS driver (e.g., the first OIS driver 311), and the second OIS driver (e.g., the second OIS driver 312). When a camera application is executed, the processor (e.g., the processor 320) may be configured to operate the first camera (e.g., the first camera 301) as a main camera, position a center of the first lens (e.g., the first lens 306) at a first point by controlling the first OIS driver (e.g., the first OIS driver 311), position a center of the second lens (e.g., the second lens 307) at a point on a first axis passing the first point by controlling the second OIS driver (e.g., the second OIS driver 312), detect an event of switching the second camera (e.g., the second camera 302) as a main camera, in response to the detection of the event, operate the second camera (e.g., the second camera 302) as the main camera, move a center of the second lens (e.g., the second lens 307) to a second point by controlling the second OIS driver (e.g., the second OIS driver 312), and move a center of the first lens (e.g., the first lens 306) to a point on a second axis parallel to the first axis and passing the second point by controlling the first OIS driver (e.g., the first OIS driver 311).

In the electronic device (e.g., the electronic device 101) according to an embodiment, the processor (e.g., the processor 320) may maintain a center of the first lens (e.g., the first lens 306) to the first point, while the main camera is switched from the first camera to the second camera.

In the electronic device (e.g., the electronic device 101) according to an embodiment, when moving a center of the first lens (e.g., the first lens 306) to a point on a second axis passing the second point parallel to the first axis after the main camera is switched from the first camera to the second camera, the processor (e.g., the processor 320) may be configured to gradually move the center of the first lens (e.g., the first lens 306) during a specific time period.

In the electronic device (e.g., the electronic device 101) according to an embodiment, the processor (e.g., the processor 320) may be configured to identify the first point and the second point, in response to operating the first camera (e.g., the first camera 301) as the main camera.

In the electronic device (e.g., the electronic device 101) according to an embodiment, the processor (e.g., the processor 320) may be configured to identify the first point and the second point, based on an image obtained by using the first camera (e.g., the first camera 301) and the second camera (e.g., the second camera 302).

In the electronic device (e.g., the electronic device 101) according to an embodiment, the electronic device (e.g., the electronic device 101) may further include an OIS controller (e.g., the OIS controller 330). The processor (e.g., the processor 320) may be configured to control the first OIS driver (e.g., the first OIS driver 311) and the second OIS driver (e.g., the second OIS driver 312) by using the OIS controller (e.g., the OIS controller 330).

In the electronic device (e.g., the electronic device 101) according to an embodiment, the electronic device (e.g., the electronic device 101) may further include a memory (e.g., the memory 350). The memory (e.g., the memory 350) may store information on the first point and second point.

In the electronic device (e.g., the electronic device 101) according to an embodiment, the electronic device (e.g., the electronic device 101) may further include a sensor (e.g., the sensor 340). The processor (e.g., the processor 320) may be configured to detect shaking of the electronic device (e.g., the electronic device 101) by using the sensor (e.g., the sensor 340), and perform OIS in a direction of suppressing the shaking.

In the electronic device (e.g., the electronic device 101) according to an embodiment, the electronic device (e.g., the electronic device 101) may further include a display (e.g., the display 360). The processor (e.g., the processor 320) may be configured to detect an input through the display (e.g., the display 360), identify strength of the input, and perform OIS in a direction of suppressing shaking depending on the input, when the strength is greater than or equal to a threshold.

In the electronic device (e.g., the electronic device 101) according to an embodiment, the processor (e.g., the processor 320) may be configured not to perform OIS on the first lens (e.g., the first lens 306) and/or the second lens (e.g., the second lens 307), when the strength is less than or equal to the threshold.

In a method of operating an electronic device (e.g., the electronic device 101) according to an embodiment, the operating method may include, when a camera application is executed, operating the first camera (e.g., the first camera 301) as a main camera, positioning a center of the first lens (e.g., the first lens 306) at a first point by controlling the first OIS driver (e.g., the first OIS driver 311), positioning a center of the second lens (e.g., the second lens 307) to a point on a first axis passing the first point by controlling the second OIS driver (e.g., the second OIS driver 312), detecting an event of switching the second camera (e.g., the second camera 302) as the main camera, in response to the detection of the event, operating the second camera (e.g., the second camera 302) as the main camera, moving a center of the second lens (e.g., the second lens 307) to a second point by controlling the second OIS driver (e.g., the second OIS driver 312), and moving a center of the first lens (e.g., the first lens 306) to a point on a second axis parallel to the first axis and passing the second point by controlling the first OIS driver (e.g., the first OIS driver 311).

In the method of operating the electronic device (e.g., the electronic device 101) according to an embodiment, the operating method may further include maintaining a center of the first lens (e.g., the first lens 306) to the first point, while the main camera is switched from the first camera to the second camera.

In the method of operating the electronic device (e.g., the electronic device 101) according to an embodiment, when moving a center of the first lens (e.g., the first lens module 306) to a point on a second axis passing the second point parallel to the first axis after the main camera is switched from the first camera to the second camera, the operating method may include gradually moving the center of the first lens (e.g., the first lens 306) during a specific time period.

In the method of operating the electronic device (e.g., the electronic device 101) according to an embodiment, the operating method may include identifying the first point and the second point, in response to operating the first camera (e.g., the first camera 301) as the main camera.

In the method of operating the electronic device (e.g., the electronic device 101) according to an embodiment, the operating method may include identifying the first point and the second point, based on an image obtained by using the first camera (e.g., the first camera 301) and the second camera (e.g., the second camera 302).

In the method of operating the electronic device (e.g., the electronic device 101) according to an embodiment, the electronic device (e.g., the electronic device 101) may further include an OIS controller (e.g., the OIS controller 330). The operating method may include controlling the first OIS driver (e.g., the first OIS driver 311) and the second OIS driver (e.g., the second OIS driver 312) by using the OIS controller (e.g., the OIS controller 330).

In the method of operating the electronic device (e.g., the electronic device 101) according to an embodiment, the electronic device (e.g., the electronic device 101) may further include a memory (e.g., the memory 350). The memory (e.g., the memory 350) may store information on the first point and second point.

In the method of operating the electronic device (e.g., the electronic device 101) according to an embodiment, the electronic device (e.g., the electronic device 101) may further include a sensor (e.g., the sensor 340). The operating method may include detecting shaking of the electronic device (e.g., the electronic device 101) by using the sensor (e.g., the sensor 340), and performing OIS in a direction of suppressing the shaking.

In the method of operating the electronic device (e.g., the electronic device 101) according to an embodiment, the electronic device (e.g., the electronic device 101) may further include a display (e.g., the display 360). The operating method may include detecting an input through the display (e.g., the display 360), identifying strength of the input, and performing OIS in a direction of suppressing shaking depending on the input, when the strength is greater than or equal to a threshold.

In the method of operating the electronic device (e.g., the electronic device 101) according to an embodiment, the operating method may include not performing OIS on the first lens (e.g., the first lens 306) and/or the second lens (e.g., the second lens 307), when the strength is less than or equal to the threshold.

According to one or more embodiments of the disclosure, an assembly deviation between cameras and/or a degree of distorting centers of lenses caused by performing OIS may be decreased.

According to one or more embodiments of the disclosure, an OIS driving range may be reliably acquired when OIS is performed in a state where a camera is switched, a magnification is modified, and shaking is detected.

Advantages acquired in the disclosure are not limited to the aforementioned advantages, and other advantages not mentioned herein may be clearly understood by those skilled in the art to which the disclosure pertains from the descriptions.

The electronic device according to various embodiments disclosed in the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an Application-Specific Integrated Circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although specific embodiments have been described, various modifications are possible without departing from the scope of the present disclosure. Therefore, the scope of the present disclosure should not be limited to and defined by the described embodiments and should be defined by the scope of the claims described below as well as equivalents to the scope of these claims

What is claimed is:
1. An electronic device comprising:
a first camera comprising a first lens and having a first field of view;
a second camera comprising a second lens and having a second field of view;
a first Optical Image Stabilization (OIS) driver configured to move the first lens within a first OIS driving range;
a second OIS driver configured to move the second lens within a second OIS driving range; and
a processor electrically coupled to the first camera, the second camera, the first OIS driver, and the second OIS driver, wherein the processor is configured to:
operate the first camera as a main camera;
position a center of the first lens at a first point by controlling the first OIS driver;
position a center of the second lens at a point on a first axis passing the first point by controlling the second OIS driver;
detect an event of switching the main camera from the first camera to the second camera;
based on the event of switching being detected, operate the second camera as the main camera;
move the center of the second lens to a second point by controlling the second OIS driver; and
move the center of the first lens to a point on a second axis parallel to the first axis and passing the second point by controlling the first OIS driver.

2. The electronic device of claim 1, wherein the processor is further configured to maintain the center of the first lens to the first point while the main camera is switched from the first camera to the second camera.

3. The electronic device of claim 1, wherein the processor is further configured to gradually move the center of the first lens to a point on the second axis passing the second point parallel to the first axis during a specific time period after the main camera is switched from the first camera to the second camera.

4. The electronic device of claim 1, wherein the processor is further configured to identify the first point and the second point based on the first camera being operated as the main camera.

5. The electronic device of claim 1, wherein the processor is further configured to identify the first point and the second point based on an image obtained by using the first camera and the second camera.

6. The electronic device of claim 1, further comprising an OIS controller,
wherein the processor is further configured to control the first OIS driver and the second OIS driver by using the OIS controller.

7. The electronic device of claim 1, further comprising a memory configured to store information on the first point and the second point.

8. The electronic device of claim 1, further comprising a sensor,
wherein the processor is further configured to:
detect shaking of the electronic device by using the sensor; and
perform OIS in a direction of suppressing the shaking.

9. The electronic device of claim 1, further comprising a display,
wherein the processor is further configured to:
detect an input through the display;
identify a strength of the input; and
based on the strength being greater than or equal to a threshold, perform OIS in a direction of suppressing shaking depending on the input.

10. The electronic device of claim 9, wherein the processor is further configured to, based on the strength being less than or equal to the threshold, not to perform OIS on the first lens and the second lens.

11. A method of operating an electronic device, the method comprising:
operating a first camera of the electronic device as a main camera;
positioning a center of a first lens included in the first camera at a first point by controlling a first Optical Image Stabilization (OIS) driver of the electronic device;
positioning a center of a second lens included in a second camera of the electronic device to a point on a first axis passing the first point by controlling a second OIS driver of the electronic device;
detecting an event of switching the main camera from the first camera to the second camera;
based on the event of switching being detected, operating the second camera as the main camera;
moving the center of the second lens to a second point by controlling the second OIS driver; and
moving the center of the first lens to a point on a second axis parallel to the first axis and passing the second point by controlling the first OIS driver.

12. The method of claim 11, further comprising maintaining the center of the first lens to the first point while the main camera is switched from the first camera to the second camera.

13. The method of claim 11, further comprising gradually moving the center of the first lens to a point on the second axis passing the second point parallel to the first axis during a specific time period after the main camera is switched from the first camera to the second camera.

14. The method of claim 11, further comprising identifying the first point and the second point based on an image obtained by using the first camera and the second camera.

15. The method of claim 11, wherein the electronic device further comprises a sensor, wherein the method further comprises:
detecting shaking of the electronic device by using the sensor; and
performing OIS in a direction of suppressing the shaking.

16. The method of claim 11, further comprising identifying the first point and the second point based on the first camera being operated as the main camera.

17. The method of claim 11, wherein the method further comprises:
detecting an input through a display of the electronic device;
identifying a strength of the input; and
performing OIS in a direction of suppressing shaking depending on the input based on the strength being greater than or equal to a threshold.

18. The method of claim 17, further comprising, based on the strength being less than or equal to the threshold, not performing OIS on the first lens and the second lens.

* * * * *